N. Chapman,
Cotton Press.

Nº 11,472.          Patented Aug. 8, 1854.

UNITED STATES PATENT OFFICE.

NATHAN CHAPMAN, OF MYSTIC RIVER, CONNECTICUT.

IMPROVEMENT IN COTTON-PRESSES.

Specification forming part of Letters Patent No. 11,472, dated August 8, 1854.

*To all whom it may concern:*

Be it known that I, NATHAN CHAPMAN, of Mystic River, in the county of New London and State of Connecticut, have invented a new and Improved Press for Pressing Cotton and other Articles to which it may be Applied; and I do hereby declare that the following is a full, clear, and exact description of the same, reference being had to the annexed drawings, making a part of this specification, in which—

Figure 1:
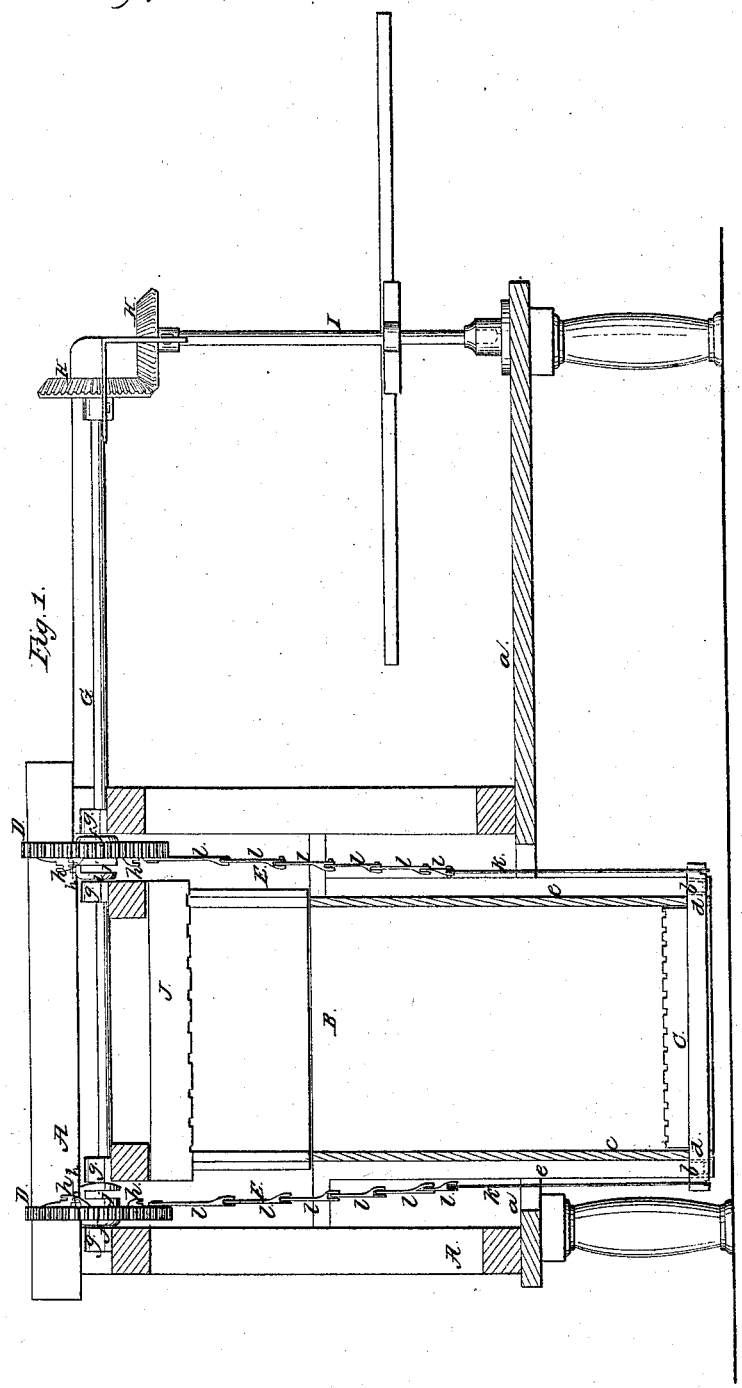
Figure 2:
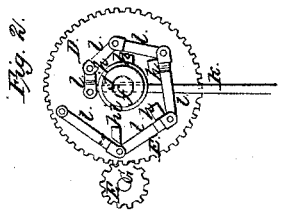

Figure 1 is a longitudinal vertical section of my improved press, taken through the center, the working parts not being bisected. Fig. 2 is a face view of one of the toothed wheels, showing the projections thereon and the chain.

Similar letters of reference indicate corresponding parts in the two figures.

The nature of my invention consists in having the hubs of the toothed wheels on which the chains which raise the follower work formed with recesses in them to receive the ends of the chains when wound up, and thereby cause said chains to exert a pressure inside of the bearings of said wheels, and retain the follower in its elevated or raised position without any device being employed for that purpose.

To enable others skilled in the art to make and use my invention, I will proceed to describe it.

A, Fig. 1, represents a frame constructed in any proper manner to support the working parts of the press.

B is the press-box, constructed in the usual manner, its lower end being some distance below a platform, $a$, which is intended to represent the surface of the ground, a hole being dug in the earth to receive the lower end of the press-box.

C is the follower, having arms $b\ b$—one at each end—which arms pass through slots $c\ c$ in the side of the press-box. The arms are provided with friction-rollers $d\ d$, which bear against side strips, $e\ e$, at the edges of the slots. (See dotted lines.)

D D are toothed wheels, the axes $f f$ of which work in suitable bearings, $g\ g$, at the upper part of the frame A. On the inner sides of the toothed wheels D D are projections $h$, which extend from the hubs $i\ i$ of the toothed wheels to their peripheries in a spiral or coil form, as shown clearly in Fig. 2, each projection extending farther outward from the wheels as they approach the peripheries. (See Fig. 1.) In the hubs $i\ i$ of the wheels D D are recesses $j\ j$, which are cut in the hubs rather past their centers.

E E are chains, the upper ends of which are secured to the inner sides of the wheels D D near their peripheries, and the lower ends are secured to rods $k\ k$, the lower ends of which are attached to the arms $b\ b$ of the follower C. (See Fig. 1.) The links $l$ of the chains E E gradually decrease in length from the tops of the chains downward, and correspond to the gradually-decreasing space between the projections $h$ on the toothed wheels D, (see Fig. 2,) the spaces between said projections decreasing from the peripheries of the wheels toward the centers. The links $l$ of the chains E E are riveted together so as to recede from the inner sides or faces of the wheels D D, and fit over the projections $h$, which, as before mentioned, gradually increase in breadth from the center of the wheels outward. The joints of the links fit over the projections and rest upon them, as shown in Fig. 2. The toothed wheels D D are operated by pinions F F, one of which is shown in Fig. 2. These pinions are hung upon a horizontal shaft, G, connected by bevel-wheels H H to an upright shaft, I, to which the power is applied.

J is a press-block at the upper end of the press-box B. The chains E E fit over the projections $h$ on the sides of the toothed wheels D D, when motion is communicated to the shaft I, and a progressive power of the follower C upon the material within the press-box is obtained as the leverage is gradually increased, owing to the spiral or coiled position of the projections upon the wheels, and when the chains are entirely wound up on the projections, the upper ends of the rods $k\ k$ pass into the recesses $j\ j$, and exert a pressure inside of the bearings of the wheels D D, and retain the follower in its elevated or raised position without any device being employed for that purpose. The links $l$, by resting upon the projections $h$, as shown, are prevented from being bent.

I do not claim the toothed wheels D D, with projections h thereon, separately, for they have been previously used; neither do I claim operating the follower by means of chains, as herein shown; but What I do claim as new, and desire to secure by Letters Patent, is—

Forming the hubs i i of the wheels D D with recesses j j in them to receive the rods k k when said chains are wound up on the projections h on the wheels, in the manner and for the purpose as herein shown and described.

NATHAN CHAPMAN.

Witnesses:
BENJ. FISH,
E. P. RANDALL.